US008380967B2

(12) United States Patent
Kinouchi

(10) Patent No.: US 8,380,967 B2

(45) Date of Patent: Feb. 19, 2013

(54) ELECTRONIC DEVICE, POWER-ON METHOD FOR AN ELECTRONIC DEVICE, AND PROGRAM

(75) Inventor: Ikkei Kinouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 12/423,188

(22) Filed: Apr. 14, 2009

(65) Prior Publication Data

US 2009/0307513 A1 Dec. 10, 2009

(30) Foreign Application Priority Data

Jun. 10, 2008 (JP) ................................ 2008-152142

(51) Int. Cl.
*G06F 15/177* (2006.01)
*G06F 1/26* (2006.01)

(52) U.S. Cl. ........................................... 713/1; 713/300

(58) Field of Classification Search .................. 713/300, 713/1
See application file for complete search history.

(56) References Cited

U.S. PATENT DOCUMENTS

| | | | | |
|---|---|---|---|---|
| 7,120,557 | B2 * | 10/2006 | Schmitz et al. | 702/183 |
| 7,730,235 | B2 * | 6/2010 | Kumasawa et al. | 710/36 |
| 7,865,652 | B2 * | 1/2011 | Stenfort | 710/306 |
| 2004/0267998 | A1 * | 12/2004 | Zimmer et al. | 710/261 |
| 2006/0265449 | A1 | 11/2006 | Uemura et al. | |
| 2007/0192637 | A1 | 8/2007 | Kubo et al. | 713/300 |

FOREIGN PATENT DOCUMENTS

| | | |
|---|---|---|
| JP | 2006-235964 | 9/2006 |
| JP | 2006/309477 | 11/2006 |
| JP | 2007-213584 | 8/2007 |
| JP | 2008-9648 | 1/2008 |

OTHER PUBLICATIONS

European Search Report dated Oct. 11, 2011 in correspondence with European Patent Application No. 09 15 6795.8.
Japanese Office Action mailed Feb. 14, 2012 issued in corresponding Japanese Patent Application No. 2008-152142.

* cited by examiner

*Primary Examiner* — Kim Huynh
*Assistant Examiner* — Eric Chang
(74) *Attorney, Agent, or Firm* — Staas & Halsey LLP

(57) ABSTRACT

An information processing unit and a storage unit are connected to each other through any one of a first interface, which is capable of interconnection in which the storage unit is powered on first, and after the storage unit is put into operation, the information processing unit is powered on, and a second interface, which is incapable of interconnection. The information processing unit has a PROM storing information on type of interface. The management unit reads out the type from the PROM upon reception of an instruction to power on the information processing unit. When the information processing unit is connected to the storage unit through the first interface, power-on is performed by predetermined control. When the information processing unit is not connected to the storage unit through the first interface, the storage unit is powered on, and then, the information processing unit is powered on.

5 Claims, 17 Drawing Sheets

| SET1 | |
|---|---|
| BLADE | SLOT NUMBER |
| SERVER BLADE | 1 |
| STORAGE BLADE | 2 |

FIG. 9

| SET2 | |
|---|---|
| BLADE | SLOT NUMBER |
| SERVER BLADE | 1 |
| STORAGE BLADE | 2,3 |

ELECTRONIC DEVICE, POWER-ON METHOD FOR AN ELECTRONIC DEVICE, AND PROGRAM

CROSS-REFERENCE TO RELATED APPLICATION

This application is based upon and claims the benefit of priority of the prior Japanese Patent Application No. 2008-152142, filed on Jun. 10, 2008 in the Japanese Patent Office, the entire contents of which are incorporated by reference.

FIELD

The present invention relates to an electronic device, a power-on method for an electronic device, and a program.

BACKGROUND

A thin circuit board (blade) mounted with such elements as a central processing unit (CPU), a memory, a hard disk, and a network controller, which are necessary for operating as a server, is called a server blade. Further, a system in which a plurality of server blades are mounted within a chassis serving as an enclosure, and are operated as one server is called a blade server.

With the server blades sharing the power supply and the management unit, the blade server get to mounting the server blades in high density and low power consumption. When the throughput is increased, the blade server can adapt the increase of the throughput just by installing additional server blades. For this reason, the blade server is superior in expandability.

Along with the installation of additional server blades, there may occur a case in which the storage capacity including the hard disk needs to be expanded. Conventionally, this has been handled by providing a storage box separately from the blade server. However, due to increasing demand for all-in-one blade servers, it is desired that the storage blade be mounted within the blade server.

Those blades constituting the blade server are mounted in the chassis via a so-called back plate. The installation of a blade to the chassis is performed by inserting the blade into a connector provided on the back plate installed inside the chassis. With this, the blade can be connected, without using a cable, to such modules as a network switch and a power supply, which are provided to the blade server.

Incidentally, as one of the arrangements for connection methods between computer main bodies and peripheral devices, a small computer system interface (SCSI) is conventionally known. Further, there exists a new standard, a serial attached SCSI (SAS), which is one type of the SCSI standards, and is capable of serial communication owing to adoption of a serial ATA (SATA) interface.

With the SCSI standards, as a data transfer method, there is adopted a parallel transfer method in which a plurality of pieces of data are transferred in parallel through a plurality of communication lines. However, with the SCSI standards, due to the fact that a large number of data signals are transferred simultaneously, slight differences in transmission speed occur among the signals. With SAS, such differences are eliminated by high-speed serial transfer, getting to transfer with high accuracy.

For this reason, the trend for the storage interface has been to shift from the SCSI interface to the SAS interface. In addition, server blades of a new generation (new-generation server blades), which are capable of storage expansion using the SAS interface, have been developed. Therefore, it is believed that, in the future, the conventional server blades (previous-generation server blades) are replaced by the use of the new-generation server blades.

[Patent document 1] JP 2006-235964 A
[Patent document 2] JP 2007-213584 A
[Patent document 3] JP 2008-9648 A As described above, in a system in which an information processing unit like a server blade and a storage unit like a storage blade are connected through an interface, when the conventional interface is replaced with a new interface, there arises a problem as to how to maintain compatibility.

Specifically, the conventional interface and the new interface have not only a difference in configuration but also various differences in function. For example, some interfaces execute a sequence in which, at power-on, the storage unit is powered on first, and then, the information processing unit is powered on. On the other hand, other interfaces do not execute such a sequence, and hence each unit needs to be powered on separately.

SUMMARY

According to an aspect of the invention, an electronic device includes: an information processing unit including at least a processor; a storage unit including an external storage device for the processor; and a management unit that controls start-up and shut-down of the information processing unit and the storage unit, in which: the information processing unit and the storage unit are connected to each other through any one of a first interface and a second interface, the first interface being capable of interconnected control in which, at power-on, the power-on of the storage unit is executed first, and after the storage unit is put into operation, the information processing unit is powered on, the second interface being incapable of the interconnected control; the information processing unit has, on a bus accessible from the management unit, a non-volatile storage device storing information that indicates a type of interface used for connecting the storage unit; and the management unit reads out, upon reception of an instruction to power on the information processing unit, the type of interface from the non-volatile storage device of the information processing unit to: when the information processing unit is connected to the storage unit through the first interface, perform the power-on by the interconnected control through the first interface; and when the information processing unit is not connected to the storage unit through the first interface, power on the storage unit, and after the storage unit is put into operation, power on the information processing unit.

The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 7 is an example of defined setting information stored in an NVRAM, illustrating a case of the set 1 as a table.

FIG. 9 is an example of defined setting information stored in an NVRAM, illustrating a case of the set 2 as a table.

DESCRIPTION OF EMBODIMENT

Hereinbelow, an electronic device according to an embodiment is described by way of example. It should be noted that a configuration of this embodiment is an example, and therefore is not intended to limit the electronic device to the following configuration.

<Outline>

In this embodiment, as the electronic device, there is exemplified a blade server. The blade server can be considered as the electronic device because the blade server has multifunctional processing capabilities including handling of department-specific business applications in a company, and database management, as well as processing of an Internet circuit board.

The blade server according to this embodiment employs, as its component server blades (corresponding to the information processing units with the processors), both new-generation server blades, which can use an SAS interface for storage expansion, and previous-generation server blades, which cannot. Owing to this, the blade server according to this embodiment can use hardware resources effectively.

Further, the new-generation server blades employ, for the storage expansion thereof, storage blades (corresponding to the storage units with the external storage devices for the processors) with the SAS interface.

Then, power is supplied from a power supply device of the blade server to the respective types of blades installed in the blade server.

Further, each of the server blades has a power supply switch, and when a server blade is used as a server, the power supply switch is turned on, whereas when a server is not used, the power supply switch is turned off.

Turn-on/off of the power supply to the new-generation server blade and the storage blade mounted in the blade server is performed in a linked manner. Accordingly, when there are provided a large number of such blades, there is no need to turn on/off the power supply thereof manually one by one. Thus, owing to the linked turn-on/off of the power supply to both the blades, it is possible to eliminate the trouble of manually turning on/off the power supply.

<Configuration of Device>

With reference to FIGS. 1 to 17, the device is described.

Figure 1:
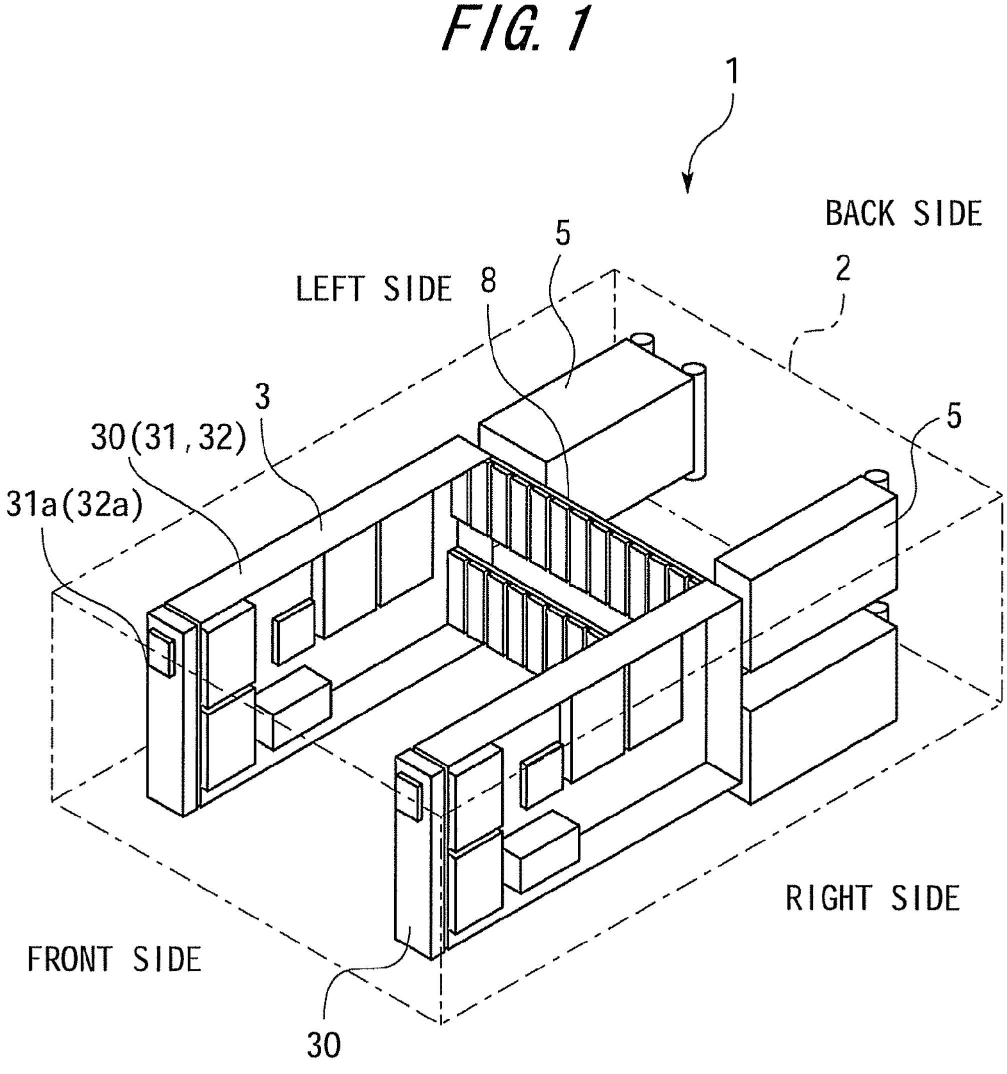
FIG. 1 is an example of a schematic perspective view of an electronic device according to an embodiment of the present invention.

As illustrated in FIG. 1, a blade server 1 is formed in a rectangular parallelepiped shape as a whole. The blade server 1 includes a chassis 2 serving as an enclosure includes several types of blades 3, power supply units 5 serving as power supply devices that supply power across the blade server 1, cooling fans 6 that blow down heat occurred in the blade server 1 to cool internal parts, and other modules. Those configuration units are mounted, via a so-called back plate 8, which is one type of circuit board, inside the chassis 2 made of such material as metal or synthetic resin.

The back plate 8 is located at the center of the longitudinal direction of the chassis 2, and is vertically provided in such a manner as to cut across the chassis 2. Because of this, when the chassis 2 with the mounted back plate 8 is viewed from above, as can be seen from FIG. 1, the plan view thereof looks substantially like the letter H.

Further, the back plate 8 is provided for the units to interconnect to one another on the back plate 8 via slots serving connectors. Therefore, wirings, that is, a bus runs throughout the surfaces and inside of the back plate 8, and various data and signals are transferred among the units via the buses.

Hereinbelow, the units of the blade server 1 are described.

The blades 3 include a previous-generation server blade 31 described above, a new-generation server blade 32, a storage blade 33 with the SAS interface, and a network switch blade 34 (see FIGS. 1 to 5). Of those, the previous-generation server blade 31 and the new-generation server blade 32 are collectively referred to as server blades, and is denoted by reference numeral 30.

Further, the blades 3 also include a management blade 35 (see FIG. 5) that manages the entire blade server 1, such as management of those various blades 31 to 34 and the power supply unit 5.

Figure 5:
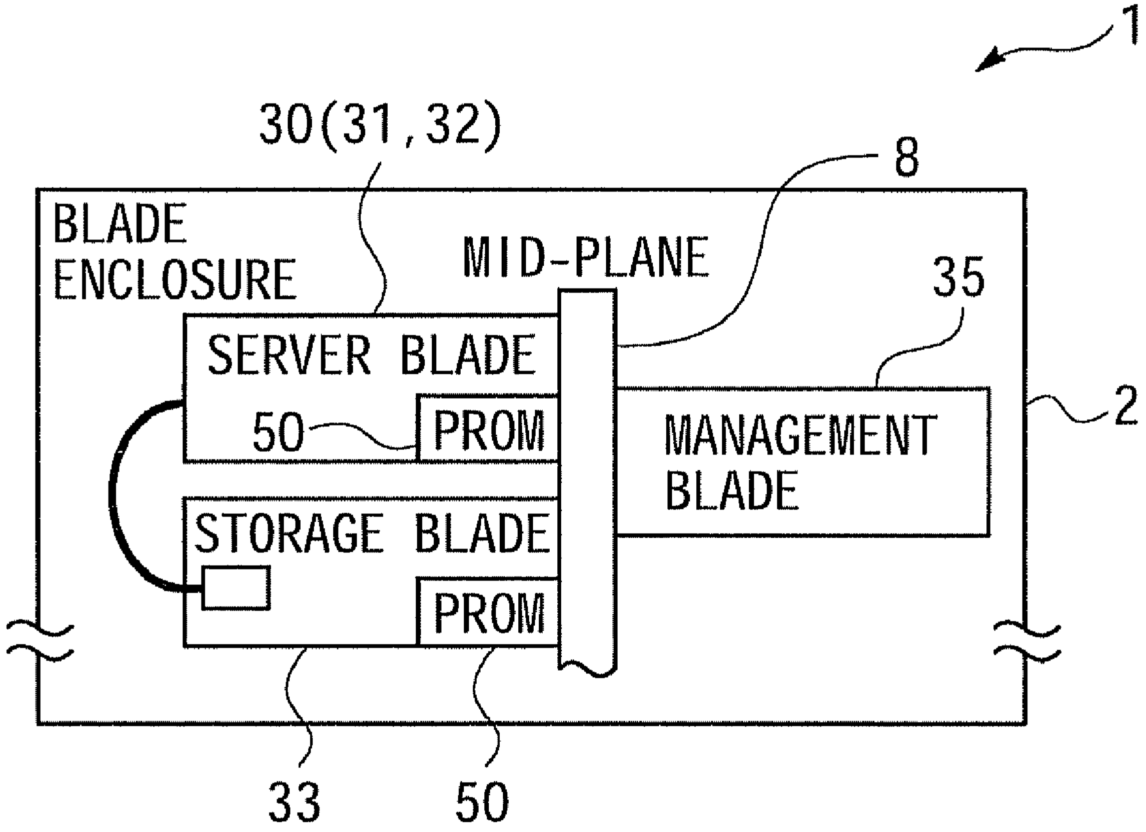
FIG. 5 is an example of a partly-omitted plan view of FIG. 1, illustrating a state in which a server blade, a storage blade, and a management blade are connected to the back plate.

Then, as illustrated in FIGS. 1, 2, 4, and 5, on one side of the back plate 8, a plurality of the previous-generation server blades 31, the new-generation server blades 32, and the storage blades 33 are provided in layers in the horizontal direction. Further, as illustrated in FIGS. 3 and 5, on the other side of the back plate 8, the management blade 35, the network switch blades 34, the power supply units 5, the cooling fans 6, and the like are mounted. Thus, the back plate 8 may be called mid-plane because of the arrangement relations among the configuration units.

It should be noted that, in FIG. 1, a side of the back plate 8, on which the blades 3 are provided, is regarded as the front side. Accordingly, the opposite side thereof is regarded as the back side. Further, a view seen from the top of FIG. 1 represents a top surface, and a view seen from the opposite side represents a bottom surface. Further, surfaces to the left side and the right side when the blade server 1 is viewed from the front side represent a left surface and a right surface, respectively.

Figure 2:
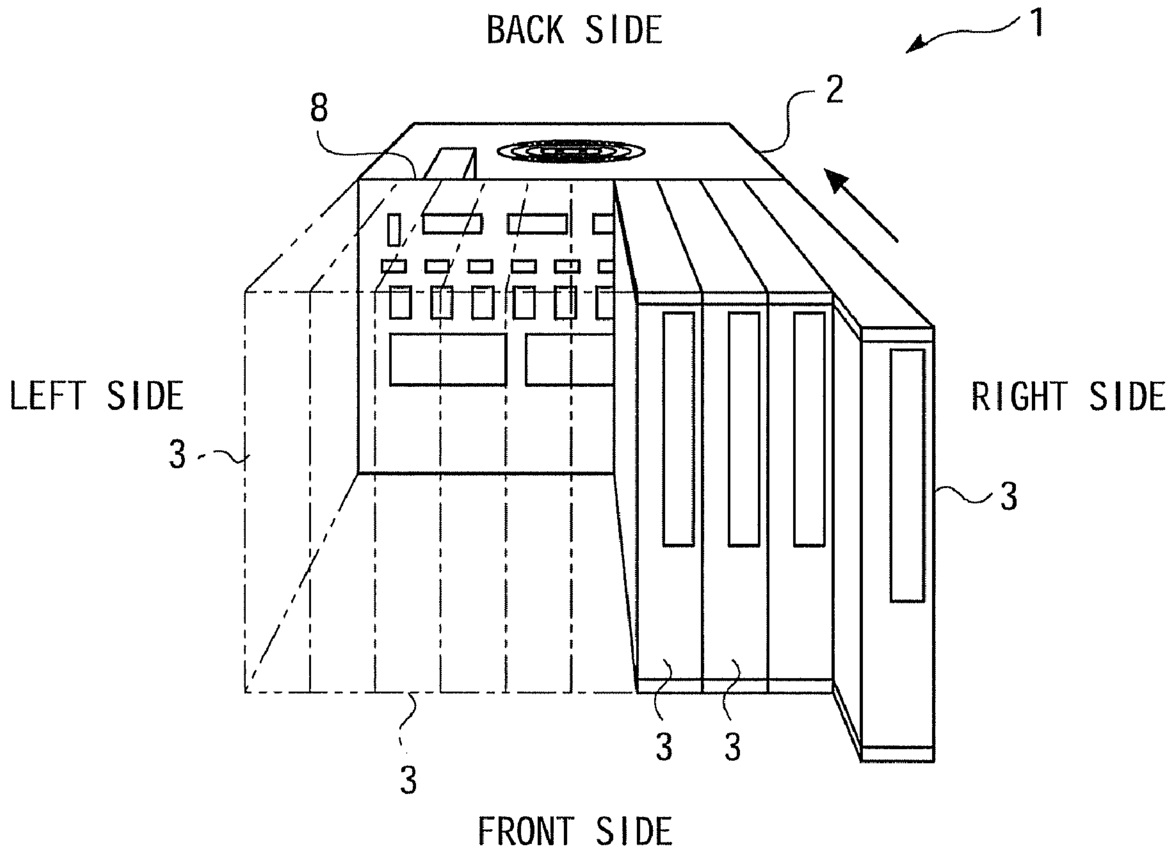
FIG. 2 is an example of a front view of FIG. 1.
Figure 3:
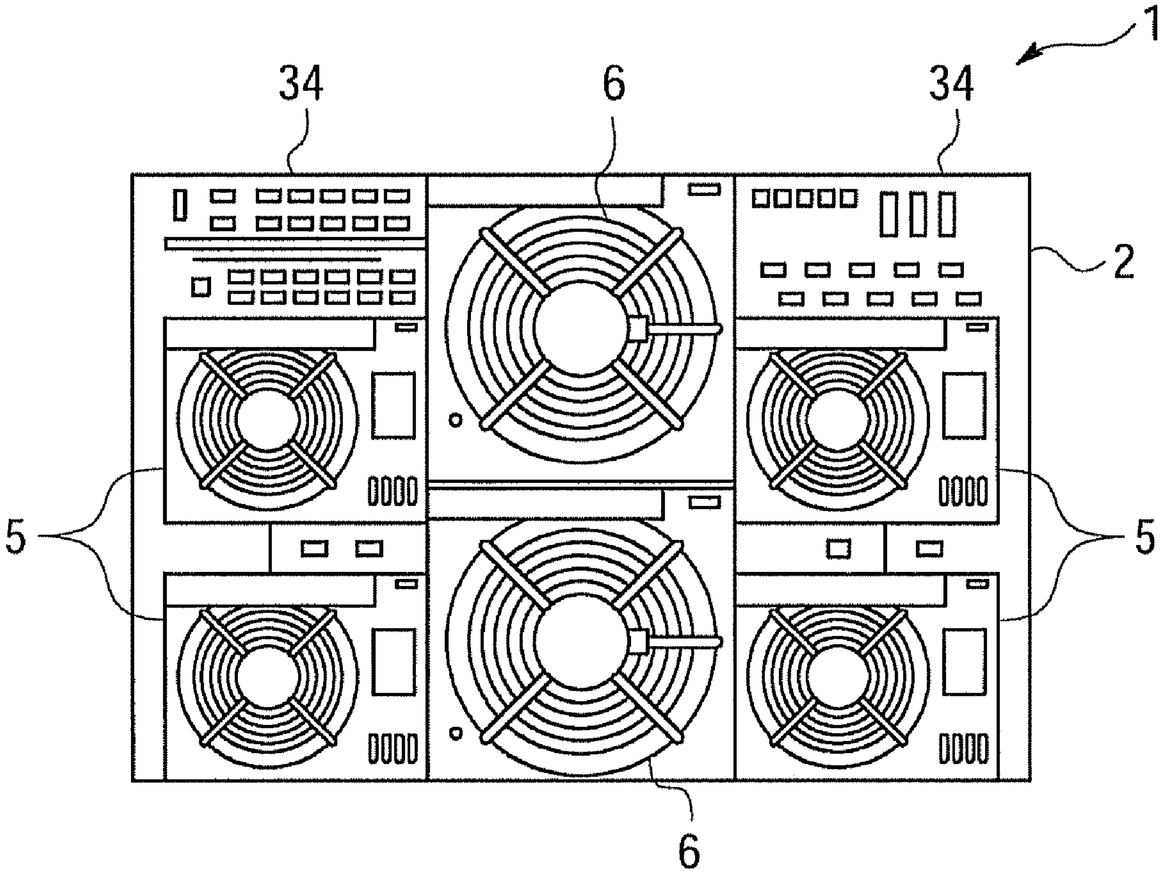
FIG. 3 is an example of a schematic back view of FIG. 1.
Figure 4:
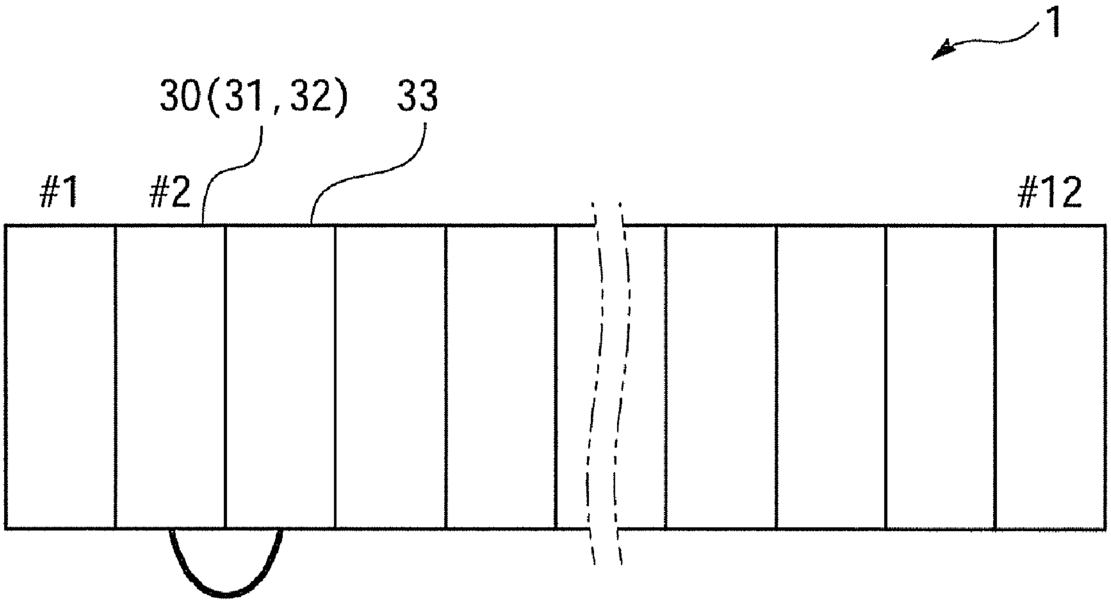
FIG. 4 is an example of a plan view of a front-side half of a back plate.

When the blade 3 is mounted on the chassis 2, the blade 3 is inserted into the chassis 2 in parallel therewith from the front side (see an arrow of FIG. 2). Further, when another blade 3 is added, the blade 3 is inserted in such a manner as to be arranged in layers with the already-mounted blade 3 in the horizontal direction.

Then, the blade 3 is inserted into a slot (connector) provided on the back plate 8, whereby the blade 3 is fixedly fit onto the back plate 8. It should be noted that, in this embodiment, twelve blades 3 can be fit onto the back plate 8. Accordingly, slots for twelve channels are provided on the back plate 8.

In addition, the back plate 8 is provided with a bus 40 (see FIG. 8), and the interface of each slot is assigned an address on the bus. Thus, slot numbers are converted into addresses. For example, a slot 1 is converted into a bus address 0x00001000; a slot 2 into a bus address 0x00002000; . . . , and a slot 12 into a bus address 0x0000C000.

The bus addresses are managed by the management blade 35.

In FIG. 7, a server blade connected to the slot 1 with a slot number 1 for a channel 1 of the back plate 8 (the same applies in a similar manner) and a storage blade connected to a slot 2 for a channel 2 of the back plate 8 in the same manner are set by way of example, and illustrated as a definition example in a form of diagram.

Referring to this diagram, the server blade 30 connected to the slot 1 and the storage blade 33 connected to the slot 2 are defined as one set for which the management blade 35 manages the power supply. Herein, the combination is referred to as a set 1.

When the locations of slots into which the server blade 30 (previous-generation server blade 31 and new-generation server blade 32) and the storage blade 33 are inserted are expressed using reference symbol N, the server blade 30 and the storage blade 33 can be indicated, for example, in the following manner. That is, the server blade 30 is located at an N-th slot from the left of the front side, and the storage blade 33 is located at an (N+1)-th slot to its right. A blade 3 that is to be inserted or is inserted via the N-th slot may be referred to as a blade at the N-th position. It is noted that, by applying the same to blades at the (N+1)-th position and thereafter, those blades are referred to as a blade at the (some number)-th position (see FIG. 6).

The setting content thus defined, that is, a locational relation between the server blade 30 and the storage blade 33 is stored in a non-volatile RAM within the management blade 35. It is noted that the definition examples illustrated in FIGS. 7 and 9 are made using a graphical user interface (GUI) on the World Wide Web (WEB). For example, the management blade 35 provides screen displays having such configurations as in FIGS. 7 and 9 to terminals (personal computers and the like) on the network.

In this manner, the locations of twelve server blades 30 respectively inserted into the chassis 2 of the back plate 8 are managed by the management blade 35 using the bus addresses.

Further, as described above, on the back side of the back plate 8, the power supply units 5, the management blade 35, and the network switch blades 34 are mounted via slots (not shown) of the back plate 8. In this manner, the units of the blade server 1 are connected to the back plate 8 without involving any cable.

Next, the previous-generation server blade 31 and the new-generation server blade 32 included in the server blade 30 are described.

The previous-generation server blade 31 is a server blade that cannot be connected to the storage blade 33 through the SAS interface (corresponding to a second interface). The previous-generation server blade 31 is connected to the storage blade 33 through a SCSI interface (corresponding to a first interface) by means of the back plate 8. On the other hand, the new-generation server blade 32 is a server blade that can be connected to the storage blade 33 through the SAS interface. In this embodiment, using an external SAS interface, the new-generation server blade 32 is connected to the storage blade 33.

In the case of the SCSI interface, which is the first interface, at power-on, it is possible, owing to interconnected control, to automatically execute the power-on of the storage unit first, and then to power on the information processing unit after the storage unit is put into operation.

The interconnected control means such a system in which, for example, when a particular information unit is powered on, another information unit is powered on after a fixed time lag from the power-on or, conversely, when a particular information unit is powered off, another information unit is powered off after a fixed time lag from the power-off.

On the other hand, in the case of the SAS interface, which is the second interface, when the SAS interface is provided externally, there is no protocol for powering on/off a plurality of information units in a linked manner. Specifically, it is impossible to automatically perform interconnected control, in which the power-on of the storage unit is executed first, and then the information processing unit is powered on after the storage unit has become in operation. Accordingly, the device actively performs such control in which the storage unit is powered on, and then, after the storage unit has become in operation, the information processing unit is powered on.

The information processing unit means the server blade. The server blade includes the new-generation server blade that can be connected to the storage unit through the SAS interface, and the previous-generation server blade that cannot be connected through the SAS interface but can be connected to the storage unit through the SCSI interface. The storage unit means the storage blade with the SAS interface.

Further, in the device, a cable 10 is used for connecting the new-generation server blade 32 and the storage blade 33. When a plurality of such sets of the new-generation server blade 32 and the storage blade 33 are coupled, expander connectors are used in addition to the connectors for coupling the cables (see FIG. 17). The connectors and the expander connectors are connected to the interfaces (not shown) on the internal circuit boards of those blades.

As has been described above, the server blade 30 is mounted with components necessary for operation as a server, including a CPU, a memory, a hard disk, a network controller, or the like. Further, the previous-generation server blade 31 and the new-generation server blade 32 each include a programmable read only memory (PROM) 50 (see FIGS. 5, 8, and 16). The PROM 50 is connected to the bus 40 of the back plate 8, and is disposed at an address space of the CPU of the management blade 35. Accordingly, by specifying the address of the bus 40, the CPU of the management blade 35 reads out information of the corresponding PROM. The PROM 50 is a non-volatile memory that contains blade information including the type of blade, interface information associated with the blade concerned, or other blade information.

The type of blade means, for example, information on generations of the server blades 30. Further, the interface information means whether or not there is an external SAS interface. The information stored in the PROM 50 is read out by the management blade 35.

The PROM 50 is not recorded with information at the time of manufacture, and a user writes data using a terminal (device called ROM writer). The PROM 50 is classified into two types.

One is a one-time type in which, once data is written, the written data cannot be altered or deleted like the normal ROM. The other one is a deletable type in which data can be erased any number of times and can be written repeatedly.

Each administrator of the server blade 30 writes the information onto the PROM 50 on the occasion of the mounting of the server blade 30 into the blade server 1 as a user. Then, after the writing is completed, setting of the system is performed.

Further, as illustrated in FIG. 1, each of the server blades 30 includes a power supply button 30*a* on the front side thereof. Instead of the power supply button 30*a* being directly operated, a power supply ON command may be issued from a client personal computer (client PC) to the management blade 35 through Ethernet (registered trademark), which is a major standard for local area networks (LANs).

Figure 6:
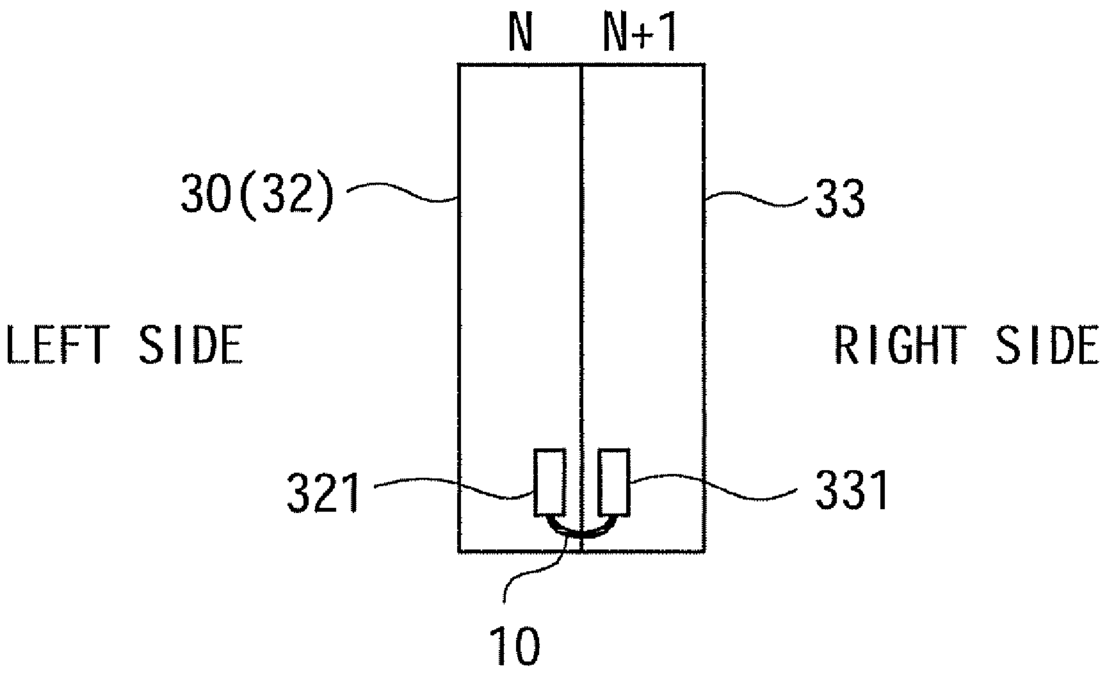
FIG. 6 is an example of a front view of a set 1.

Further, the installation position of an SAS connector 321 of the new-generation server blade 32 is, for example, as illustrated in FIG. 6, provided at the right of the front of the new-generation server blade 32. On the other hand, an SAS connector 331 of the storage blade 33, which is described below, is located, as can be seen from FIG. 6, at the left of the front of the storage blade 33.

Figure 17:
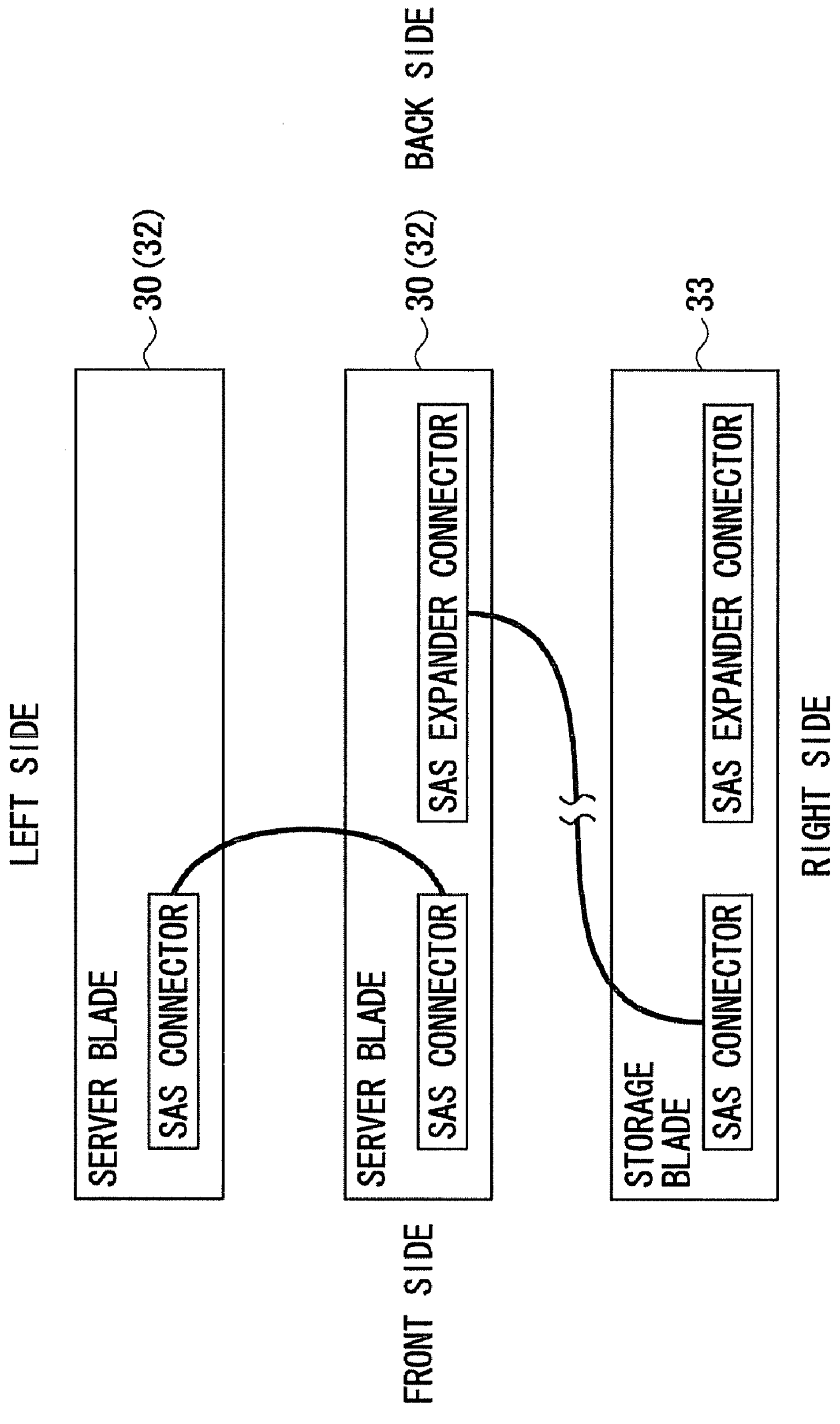
FIG. 17 is an example of a front view of a state of a set 6.

Here, when the new-generation server blades 32 are coupled with each other, the connectors and the expander connectors are used in the same manner as in the case of coupling the blades described above, but the connectors are the SAS connectors and the expander connectors are SAS expander connectors (see FIG. 17).

Next, the storage blade 33 is described.

The storage blade 33 with the SAS interface has basically the same mechanism as a hard disk drive (HDD), and is controlled by a controller (not shown) included in the storage blade 33.

The storage blade 33 is provided with the PROM 50 as well (see FIG. 5, etc.). The PROM 50 of the storage blade 33 is connected to the bus 40, too, and is disposed at an address space of the CPU of the management blade 35. In the PROM 50, for example, the type of the blade (that is, storage blade), and the interface information are stored. It is noted that information as to which server blade is coupled with the storage blade may be stored in the PROM 50 of the storage blade 33. For example, it is requested that the slot numbers of the server blades 30 connected to the respective PROMs 50 of the storage blades 33 may be set.

The network switch blade 34 is a blade for connecting between the server blade 30 and an external local area network (LAN).

The management blade 35 is mounted with dedicated CPU, LAN, and serial ports or the like. Thus, the management blade 35 can perform network communication and error monitoring operation independently from the state of the server blade 30 (hang state or the like). Further, the management blade 35 monitors the state of each of the units mounted within the chassis 2. In addition, the management blade 35 keeps track of the types of the blades mounted within the chassis 2.

Further, the management blade 35 manages the turn-on/off of the power supply to the server blade 30. The management of the turn on/off of the power supply to the server blade 30 prevents a situation in which too many server blades 30 are mounted beyond the maximum power consumption of the blade server 1. With this, the system is prevented from going down.

In order to execute such management, the management blade 35 makes estimation on the type of blade and the power consumption by the blade to some extent. Then, the management blade 35 manages the power supply to the unit when it is judged that there is no problem. Thus, setting is made such that, when a server blade 30 having a power consumption large enough to exceed the maximum power supply capacity of the blade server 1 is mounted on the back plate 8, the server blade 30 is not powered on.

For this reason, the management blade 35 performs reading with respect to the PROM 50 of the server blade 30 and the PROM 50 of the storage blade 33 to collect necessary information. As a result of the collection of the necessary information, the management blade 35 judges whether or not the server blade 30 is connectable to the storage blade 33 with the SAS interface based on the information stored in the PROMs 50. Therefore, it can be said that the management blade 35 functions as judgment means.

Further, as a result of the judgment, when it is judged that the server blade 30 is the new-generation server blade 32, the management blade 35 controls the turn-on/off of the power supply with respect to the storage blade 33 and the new-generation server blade 32 in a linked manner. Specifically, the startup and the shutdown of the new-generation server blade 32 and the storage blade 33 are controlled in a linked manner.

Here, when the storage blade 33 and the new-generation server blade 32 are powered on in a linked manner, the management blade 35 starts up the storage blade 33 before starting up the new-generation server blade 32. This is because when the CPU of the new-generation server blade 32 cannot recognize the storage blade 33, the CPU of the new-generation server blade 32 may judge that the storage blade 33 is not mounted in the blade server 1.

On the other hand, when the storage blade 33 and the new-generation server blade 32 are powered off in a linked manner, the management blade 35 powers off the new-generation server blade 32 first. This is because when the storage blade 33 is powered off first, the management blade 35 may erroneously judge that the storage blade 33 has been broken.

When the judgment made by the management blade 35 serving as the judgment means indicates the previous-generation server blade 31, the management blade 35 controls the turn-on/off of the power supply in an unlinked manner. In this case, in accordance with the conventional SCSI standard, the storage blade 33 is first powered on, and, after the storage blade 33 is started up, the server blade 30 is automatically started up.

Thus, by reading out the information of the PROMs 50, the management blade 35 judges whether or not there is a power supply linkage in a relation between the storage blade 33 with the SAS interface and any one of the previous-generation server blade 31 and the new-generation server blade 32. Accordingly, the management blade 35 can be regarded to include functional means of power supply linkage control means.

Besides, upon request for the turn-on/off of the power supply to any one of the previous-generation server blade 31 at the N-th position and the new-generation server blade 32 at the N-th position described above, the management blade 35 accesses the server blade 31 or 32 at the N-th position to read out the address thereof.

Next, the power supply unit 5 is described.

The power supply unit 5 is provided in plural, and has a power supply device built therein. The power supply unit 5 is coupled to the back plate 8 via a power supply connector (not shown), and supplies power to the blades and modules coupled to the back plate 8.

Further, in this embodiment, four power supply units 5 are mounted for redundancy. The redundancy means a safeguard for, even when a system becomes inoperable while the system is in use, restarting the system using a bypass, switch-over, and a substitute or the like.

In this embodiment, normally, the setting is made such that two power supply units 5 are put into operation. Then, when at least one of the two normally-operated power supply units 5 is broken, another power supply unit 5 that is not in operation is put into operation instead. Further, normally, three power supply units 5 may be put into operation, and when one of them is broken, that one may be replaced with the power supply unit 5 that is not in operation. Further, along with the addition of the blade 3, in order to deal with a shortage of current capacity, more power supply units that are not in operation may be put into operation.

Figure 10:
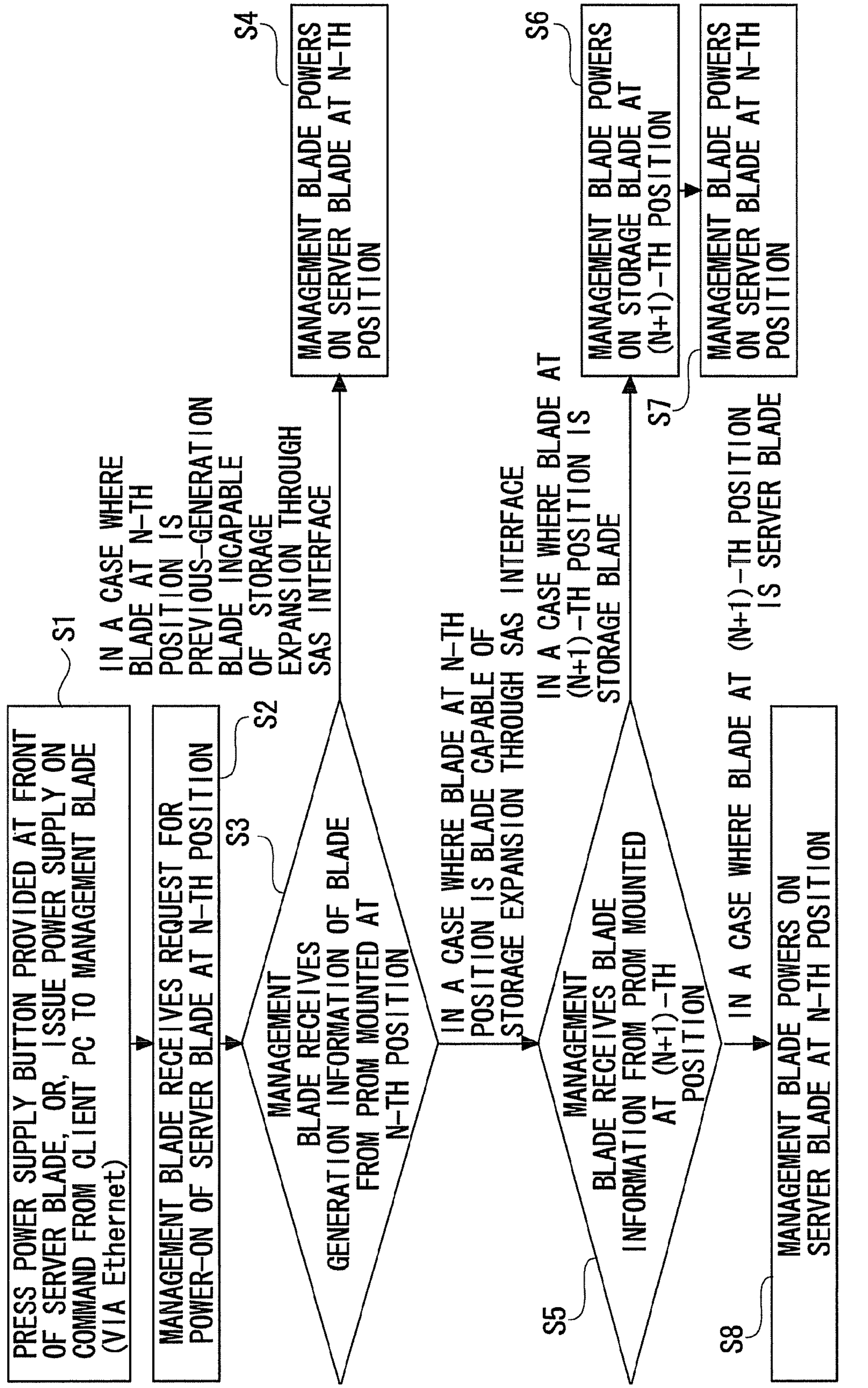
FIG. 10 is an example of a flow chart for describing a procedure in which, based on blade information stored in a PROM, the management blade turns on power supply to a new-generation server blade and power supply to the storage blade adjacent thereto in a linked manner.
Figure 11:
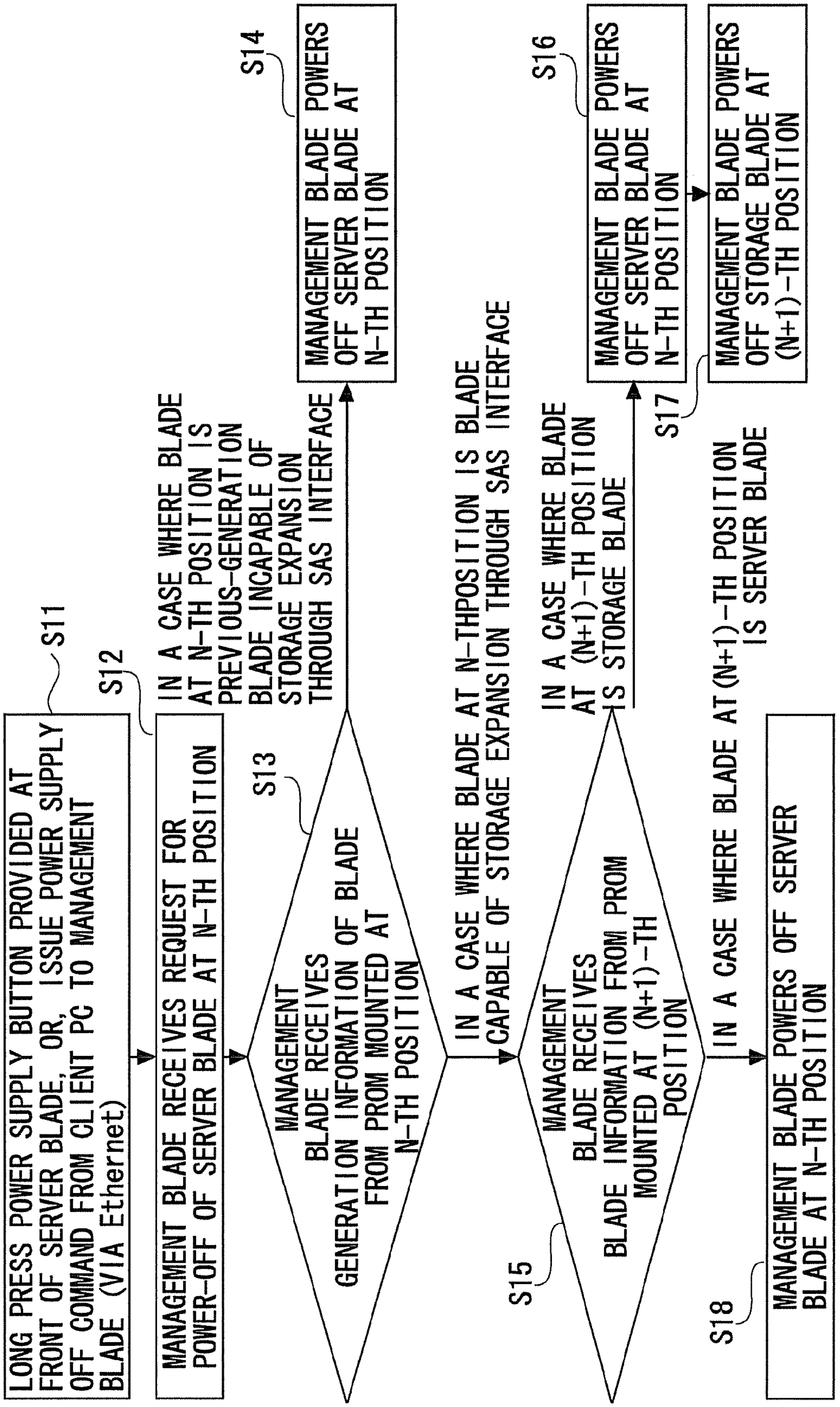
FIG. 11 is an example of a flow chart for describing a procedure in which, based on the blade information stored in the PROM, the management blade turns off the power supply to the new-generation server blade and the power supply to the storage blade adjacent thereto in a linked manner.

Next, with reference to FIGS. 6, 10, and 11, a description is made of how the power supply of the new-generation server blade 32 at the N-th position and the power supply of the storage blade 33 at the (N+1)-th position are linked by the management blade 35 based on blade information stored in the PROMs 50 of the server blade 30 and the storage blade 33.

First, a case in which the power supply is turned on is described.

Referring to FIG. 10, in Step (hereinafter, denoted by S) 1, a user performs a power-on operation with respect to the server blade 30 at the N-th position. Alternatively, an ON command for powering on the server blade 30 at the N-th position is issued via Ethernet from a client personal computer (client PC) to the management blade 35.

In S2, the management blade 35 receives a request for the power-on of the server blade 30 at the N-th position. This is just a request, and hence the server blade 30 has not actually been powered on yet. It is noted that the following steps are managed by the management blade 35.

In S3, the management blade 35 receives, from the PROM 50 of the server blade 30 mounted at the N-th position, the blade information of the server blade 30, and then checks whether the generation of the server blade 30 is the new one or the previous one.

In S3, when the server blade 30 at the N-th position is the previous-generation server blade 31, that is, the server blade 30 that cannot be connected to the storage blade 33 through the SAS interface, the processing proceeds to S4. On the other hand, when the server blade 30 at the N-th position is the new-generation server blade 32, that is, the server blade 30 that can be connected to the storage blade 33 through the SAS interface, the processing proceeds to S5. The fact that the server blade 30 cannot be connected to the storage blade 33 means that the expansion of storage for the server blade 30 is impossible.

In S4, the management blade 35 powers on the previous-generation server blade 31, which is the server blade 30 at the N-th position. Here, when S4 is selected in S3, there is no linkage with the blade at (N+1)-th and after position. This is because the present invention is a device that performs, when the server blade 30 at the N-th position is the new-generation server blade 32 and the server blade 30 at the (N+1)-th position is the storage blade 33, linking of the power on/off to the both using the external SAS interface.

The previous-generation server blade 31 is connected, via the back plate 8, to the storage blade 33 through the SCSI interface, and, at power-on, the interconnected control is automatically executed, in which the power-on of the storage blade 33 is executed first, and after the storage blade 33 is put into operation, the previous-generation server blade 31 is powered on. However, herein, for the purpose of simplification, the management blade 35 is only described to power on the server blade 30 at the N-th position.

In S5, the management blade 35 receives the blade information of the blade 3 from the PROM 50 of the blade 3 at the (N+1)-th position. Based on the received blade information, when the blade 3 at the (N+1)-th position is the storage blade 33, the processing proceeds to S6. When the blade 3 at the (N+1)-th position is the server blade 30, the processing proceeds to S8.

In S6, the management blade 35 powers on the storage blade 33 at the (N+1)-th position, and the processing proceeds to S7. In S7, the management blade 35 powers on the server blade 30 at the N-th position. Specifically, when the server blade 30 at the N-th position is powered on, the storage blade 33 at the (N+1)-th position is powered on first. This is because, as has been described above, when the CPU of the new-generation server blade 32 cannot recognize the storage blade 33, the CPU of the new-generation server blade 32 may judge that the storage blade 33 is not mounted in the blade server 1.

In S8, the management blade 35 powers on the server blade 30 at the N-th position. Specifically, when the server blades 30 are at the N-th position and the (N+1)-th position, the server blade 30 at the N-th position, which is the smaller number, is powered on. As to the power supply at the (N+1)-th position, the user does not perform the power-on operation, and hence the power supply is not turned on.

Next, a case in which the power supply is turned off is described.

In the above-mentioned case where the power supply is turned on, when the new-generation server blade 32 is at the N-th position and the storage blade 33 is at the (N+1)-th position, the storage blade 33 is powered on first. On the other hand, in the case where the power supply is turned off, the new-generation server blade 32 at the N-th position is powered off first, and after that, the storage blade 33 at the (N+1)-th position is powered off.

In S11, the user performs the power-off operation (for example, long press of power supply button) with respect to the server blade 30 at the N-th position. Alternatively, an OFF command for powering off the server blade 30 at the N-th position is issued via Ethernet from the client personal computer (client PC) to the management blade 35.

In S12, the management blade 35 receives a request for the power-off of the server blade 30 at the N-th position. This is just a request, and hence the server blade 30 has not actually been powered off yet. The following is managed by the management blade 35.

In S13, the management blade 35 receives, from the PROM 50 of the server blade 30 mounted at the N-th position, the blade information of the server blade 30, and then checks whether the generation of the server blade 30 is the new one or the previous one.

In S13, when the blade 3 at the N-th position is the previous-generation server blade 31, that is, the server blade 30 that cannot be connected to the storage blade 33 through the SAS interface, the processing proceeds to S14. On the other hand, when the blade 3 at the N-th position is the new-generation server blade 32, that is, the server blade 30 that can be connected to the storage blade 33 through the SAS interface, the processing proceeds to S15.

In S14, the management blade 35 powers off the previous-generation server blade 31, which is the server blade 30 at the N-th position. Here, when the proceeding to S14 is selected in S13, there is no linkage with the server blades 30 inserted at the numbers of (N+1)-th and after. This is because, as has been described above, the present invention is a device for performing, when the server blade 30 at the N-th position is the new-generation server blade 32 and the server blade 30 at the (N+1)-th position is the storage blade 33, linking of the power supply to the both.

In S15, the management blade 35 receives the blade information of the blade 3 from the PROM 50 of the blade 3 at the (N+1)-th position. Based on the received blade information, when the blade 3 at the (N+1)-th position is the storage blade 33, the processing proceeds to S16. When the blade 3 at the (N+1)-th position is the server blade 30, the processing proceeds to S18. The blade 3 at the (N+1)-th position may be the new-generation server blade 32 or the previous-generation server blade 31.

In S16, the management blade 35 powers off the new-generation server blade 32, which is the server blade at the N-th position. After that, the processing proceeds to S17. In S17, the management blade 35 powers off the storage blade 33 at the (N+1)-th position. Specifically, when the server blade 30 at the N-th position is powered off, the storage blade 33 at the (N+1)-th position is powered off thereafter. This is because, as has been described above, when the storage blade 33 is powered off first, the management blade 35 may erroneously judge that the storage blade 33 has been broken.

In S18, the management blade 35 powers off the server blade 30 at the N-th position. Specifically, when the server blades are at the N-th position and the (N+1)-th position, the server blade at the N-th position, which is the smaller number, is powered off. As to the power supply at the (N+1)-th position, the user does not perform the power-off operation, and hence the power supply is not turned off.

Next, with reference to FIGS. 8, 9, 12, and 13, a description is made of a case in which the power supply is linked based on the defined setting information stored in the NVRAM of the management blade 35. It is noted that, in this case, there is mounted a single server blade 30 whereas there are mounted a plurality of storage blades 33 in series.

Figure 8:
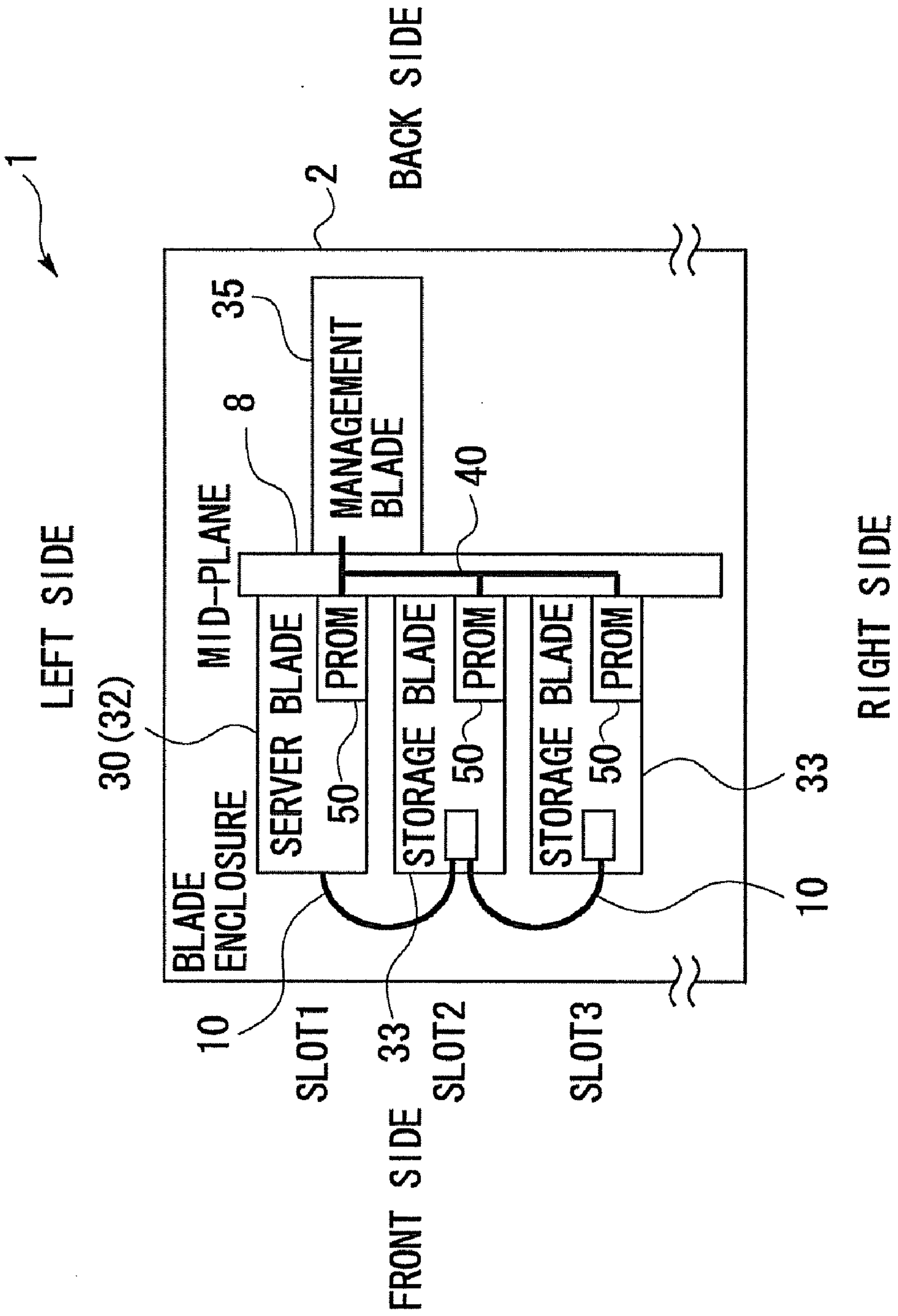
FIG. 8 is an example of a plan view of a state of a set 2.

Referring to FIGS. 8 and 9, there is illustrated an example in which the server blade 30 is located at the N-th slot, and the storage blade 33 is installed at each of the slots from the (N+1)-th position to the (N±α)-th position, which is ±α away from the N-th position. This is referred to as set 2.

In the FIG. 8, there is exemplified a case in which, assuming that the slot 1 is at the N-th position, the server blade 30 is installed at that position, and the storage blades 33 are inserted to all of the slots located to the right side from that position as the starting point. Assuming that a slot 3 corresponds to a position of +α, the storage blades 33 are inserted into the slots 2 and 3. Specifically, the information processing unit and the storage unit are provided in plural, and such a plurality of units are sorted by unit type and connected in series.

First, the case in which the power supply is turned on is described.

Figure 12:
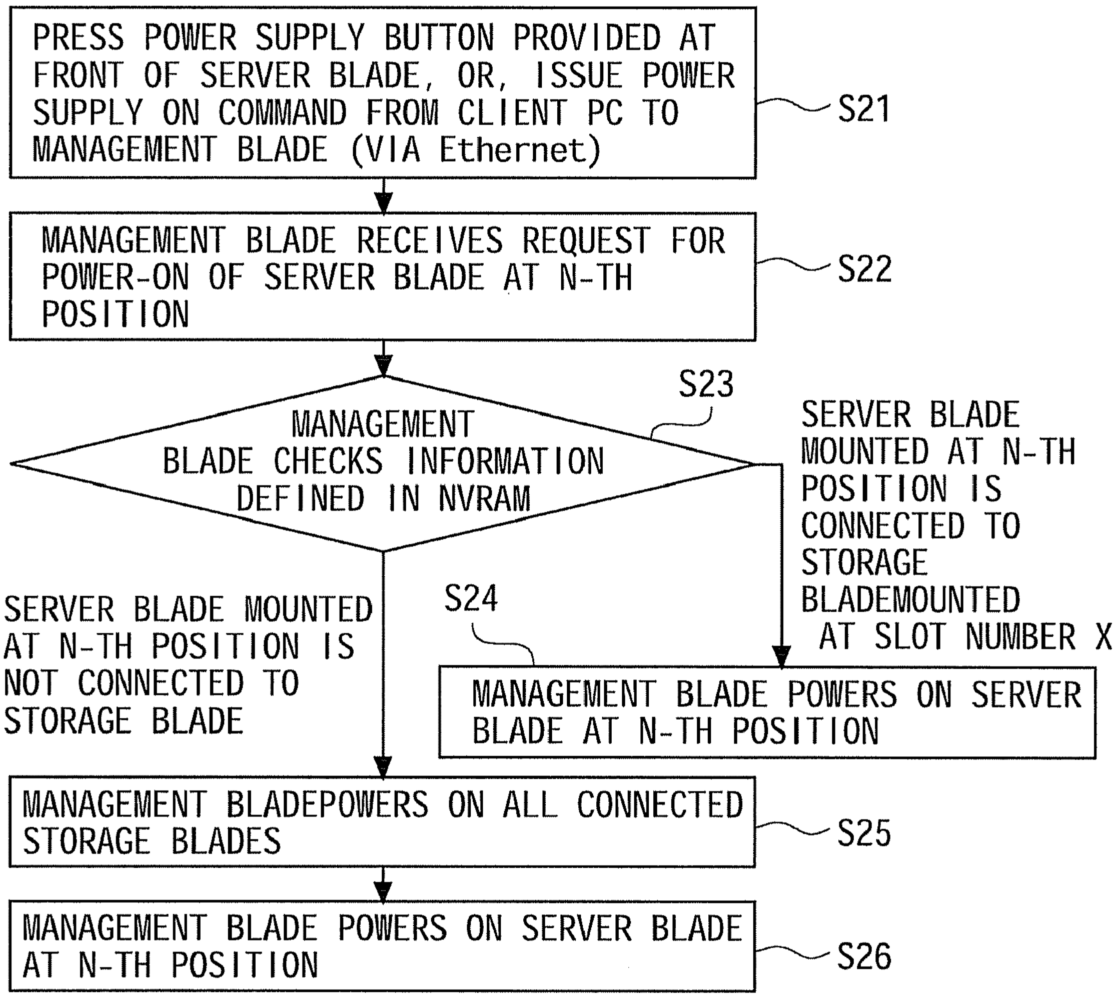
FIG. 12 is an example of a flow chart for describing a case of linking the power supply based on the defined setting information stored in the NVRAM, which is for a case in which the power supply is turned on in a linked manner.
Figure 13:
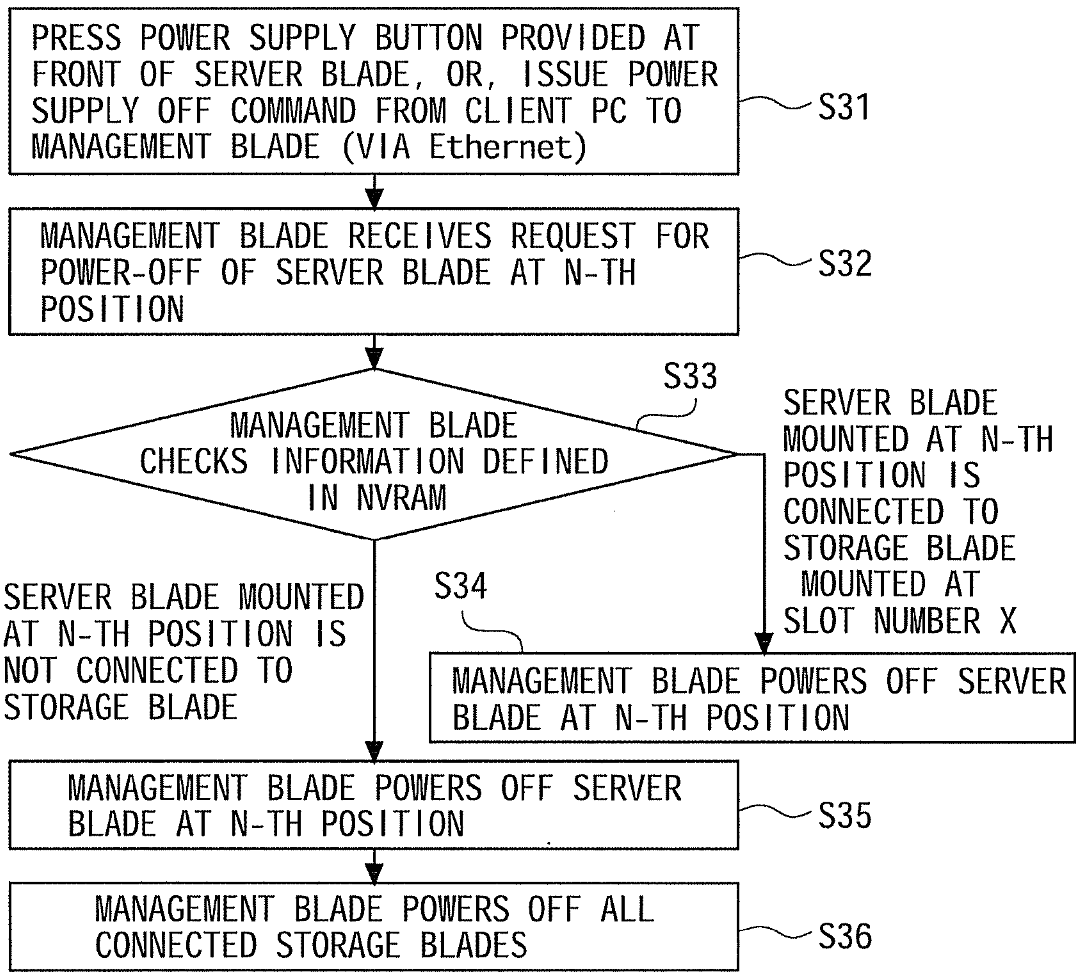
FIG. 13 is an example of a flow chart for describing the case of linking the power supply based on the defined setting information stored in the NVRAM, which is for a case in which the power supply is turned off in a linked manner.

Referring to a flow chart of FIG. 12, in S21, the user performs the power-on operation with respect to the server blade 30 at the N-th position. Alternatively, the ON command for powering on the server blade 30 at the N-th position is issued via Ethernet from the client personal computer (client PC) to the management blade 35.

In S22, the management blade 35 receives a request for the power-on of the server blade 30 at the N-th position. This is just a request, and hence the power supply has not actually been turned on yet. The following is managed by the management blade 35.

In S23, the management blade 35 checks the setting information (set 2 in this case) defined in the NVRAM. As a result of this, when the server blade 30 mounted into the N-th slot is not connected to the storage blade 33 through the SAS interface, the processing proceeds to S24.

In S24, the management blade 35 powers on the server blade 30 at the N-th position.

As a result of the checking in S23, when the management blade 35 judges that the server blade 30 at the N-th position is connected, through the SAS interface, to the storage blade 33 that is mounted into the slot located +α away, that is, at the (N+α)-th position, the processing proceeds to S25.

In S25, the management blade 35 powers on the storage blades 33 that are inserted into the slots located between the server blade 30 located at the N-th slot and the storage blade 33 at the (N+α)-th position (from (N+1)-th to (N+α)-th). Specifically, all the storage blades are powered on.

It is noted that, herein, there has been described an example in which a plurality of the storage blades 33 are arranged in series from the slot next to the server blade 30. However, the series arrangement does not necessarily need to be made. In such a case, it is only necessary to write the location (slot number) of the storage blade 33 connected to the PROM 50 of the server blade 30. For example, N+αi (i=1, . . . k) is used.

In S26, the management blade 35 powers on the new-generation server blade 32, which is the server blade at the N-th position.

Next, the case in which the power supply is turned off is described.

In S31, the user performs the power-off operation with respect to the server blade 30 at the N-th position. Alternatively, the OFF command for powering off the server blade 30 at the N-th position is issued via Ethernet from the client personal computer (client PC) to the management blade 35.

In S32, the management blade 35 receives a request for the power-off of the server blade 30 at the N-th position. This is just a request, and hence the power supply has not actually been turned off yet. The following is managed by the management blade 35.

In S33, the management blade 35 checks the setting information (set 2 in this case) defined in the NVRAM. As a result of this, when the server blade 30 mounted into the N-th slot is not connected to the storage blade 33 through the SAS interface, the processing proceeds to S34.

In S34, the management blade 35 powers off the server blade 30 at the N-th position.

As a result of S33, when the server blade 30 at the N-th position is connected, through the SAS interface, to the storage blade 33 that is mounted into the (N+α)-th slot located +α away, the processing proceeds to S35.

In S35, the management blade 35 powers off the server blade 30 at the N-th position.

In S36, the management blade 35 powers off the storage blades 33 that are inserted into the slots located between the server blade 30 located at the N-th slot and the storage blade 33 at the (N±α)-th position (from (N+1)-th to (N+α)-th). Specifically, all the storage blades are powered off.

According to the blade server 1 described above, the previous-generation server blade 31 and the new-generation server blade 32 can be used together in the blade server 1. Hence, effective utilization of the hardware resources can be achieved. In addition, even when an external storage blade 33 with the SAS interface is used for storage expansion of the new-generation server blade 32, the power supply to both the new-generation server blade 32 and the storage blade 33 can be turned on/off in a linked manner. As a result, with the blade server 1, the turn-on and shut-down of the power supply can be performed smoothly. Specifically, there is no need to perform the turn-on/off of the power supply of the new-generation server blade 32 and the power supply of the storage blade 33 connected to the new-generation server blade 32 manually one by one.

Therefore, it is possible to save the trouble of manually turning on/off the power supply.

Besides, the new-generation server blade 32 and the storage blade 33 associated therewith are connected in series, and hence the management can be performed with ease without confusing the blade with another blade.

<Computer-Readable Recording Medium>

It is possible to record a program, which causes a computer or another machine or device (hereinafter, referred to as computer or the like) to realize any one of the above-mentioned functions, on recording media readable by the computer or the like. Then, by allowing the computer or the like to load and execute the program on the recording media, it becomes possible for the computer or the like to provide such functions.

Here, the recording media readable by the computer or the like mean recording media that accumulate such information as data and programs by the electric, magnetic, optical, mechanical, or chemical action, and that can be read by the computer or the like.

Among such recording media, as those removable from the computer or the like, there exist, for example, a flexible disk, a magnet-optical disk, a CD-ROM, a CD-R/W, a DVD, a DAT, an 8 mm tape, a memory card, and the like.

Further, as recording media fixed to the computer or the like, there exist a hard disk, a ROM (read only memory), and the like.

It is noted that the present invention is not limited to the above-mentioned figure exemplications, and it is needless to say that various changes and modifications can be made within the spirit and scope of the present invention.

For example, apart from the sets 1 and 2, sets 3 to 6 described below are conceivable.

Figure 14:
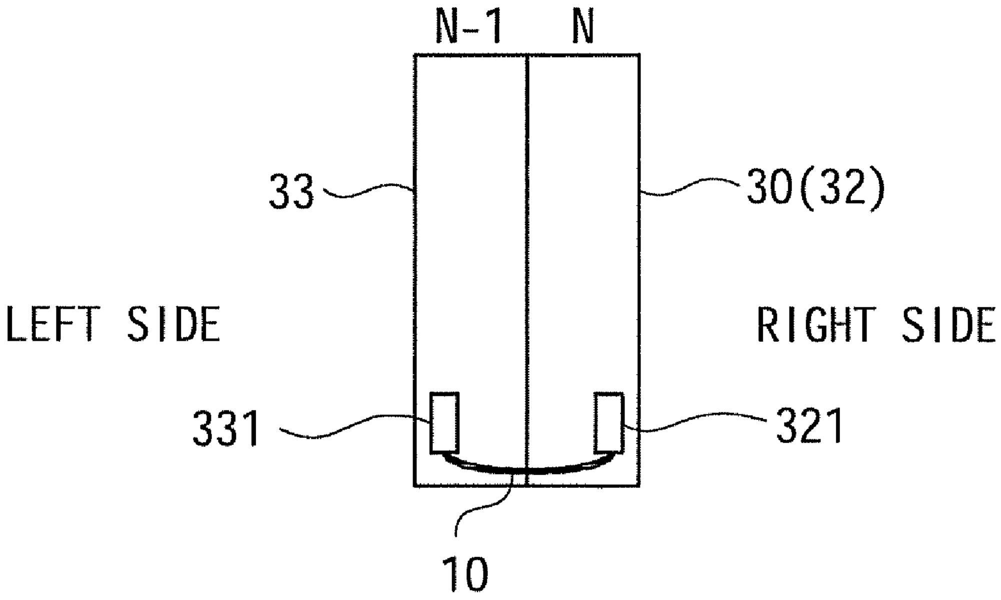
FIG. 14 is an example of a front view of a state of a set 3.

With reference to FIG. 14, a set 3 is described. The set 3 is different from the set 1 illustrated in FIG. 6 in that the server blade 30 (new-generation server blade 32) and the storage blade 33 have changed locations with each other. Specifically, the server blade 30 (new-generation server blade 32) is located at the N-th slot, whereas the storage blade 33 is located to the immediate left thereof at the (N−1)-th slot.

The length of the cable 10 that connects the new-generation server blade 32 and the storage blade 33 via the connectors 321 and 331 is set at substantially equal to or slightly longer than the distance between the connectors 321 and 331. As described above, the installation location of the SAS connector 321 of the new-generation server blade 32 is, for example, at the right of the front of the new-generation server blade 32 as illustrated in FIG. 6. On the other hand, the SAS connector 331 of the storage blade 33 described below is, for example, as can be seen from FIG. 6, located at the left of the front of the storage blade 33. In the set 3, the positions of the both are changed from the case of the set 1 illustrated in FIG. 1, and hence the distance between the connectors 321 and 331 of the set 3 becomes longer than that of the set 1. Due to this, the cable 10 of the set 3 needs to be longer than the cable 10 of the set 1. Accordingly, when the cable 10 of the set 1 is used for the set 3, it is impossible to connect, from a physical point of view, the server blade at the N-th position and the storage blade at the (N−1)-th position with the cable 10 having the length for the set 1.

On the other hand, when the cable of the set 3 is used for the set 1, the cable 10 is too long. Therefore, it is possible to allow the user to notice a placement error of the server blade 30 or to notice that the cable 10 is not a specified one.

Figure 15:
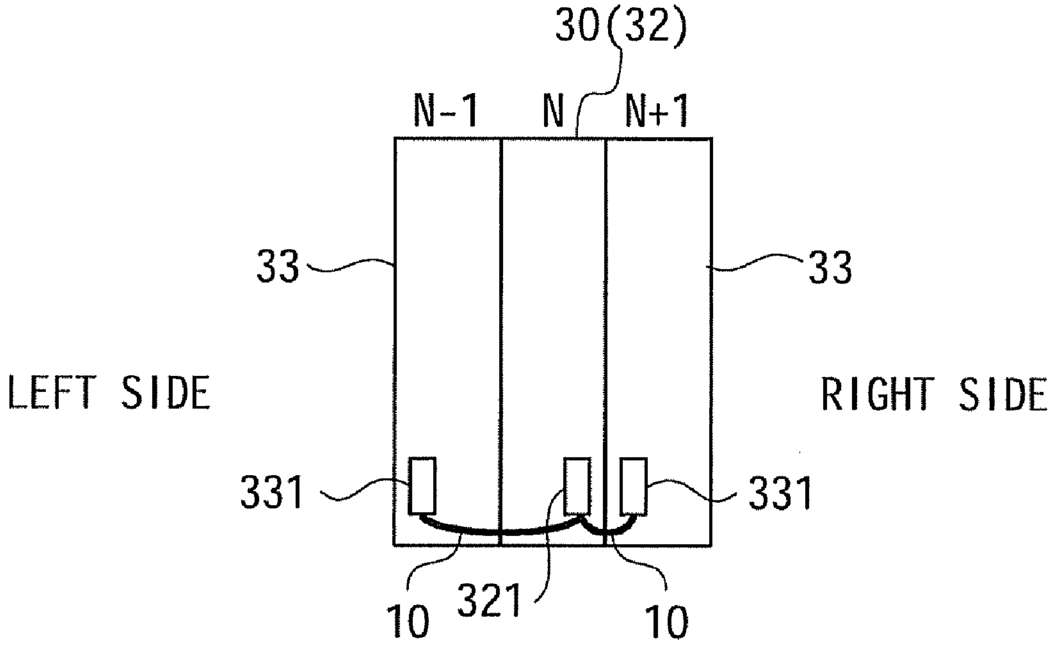
FIG. 15 is an example of a front view of a state of a set 4.

FIG. 15 illustrates a set 4. In the set 4, the storage blades 33 are mounted at both adjacent sides of the server blade 30 (new-generation server blade 32).

Specifically, the server blade 30 is located at the N-th slot, whereas the storage blades 33 are respectively located at the (N−1)-th and (N+1)-th slots, which are to the immediate right and left of the server blade 30.

Here, the lengths of the cables 10 connecting the server blade 30 (new-generation server blade 32) and the left and right storage blades 33 are different, and hence, by forming the connectors for connecting, with the cables, the server blade 30 (new-generation server blade 32) and the storage blades 33 at the centers of the respective blades, the cables 10 can be made equal in length. Accordingly, in such a case, only management of the cables with a fixed length is required, which allows easy management of the cables.

Figure 16:
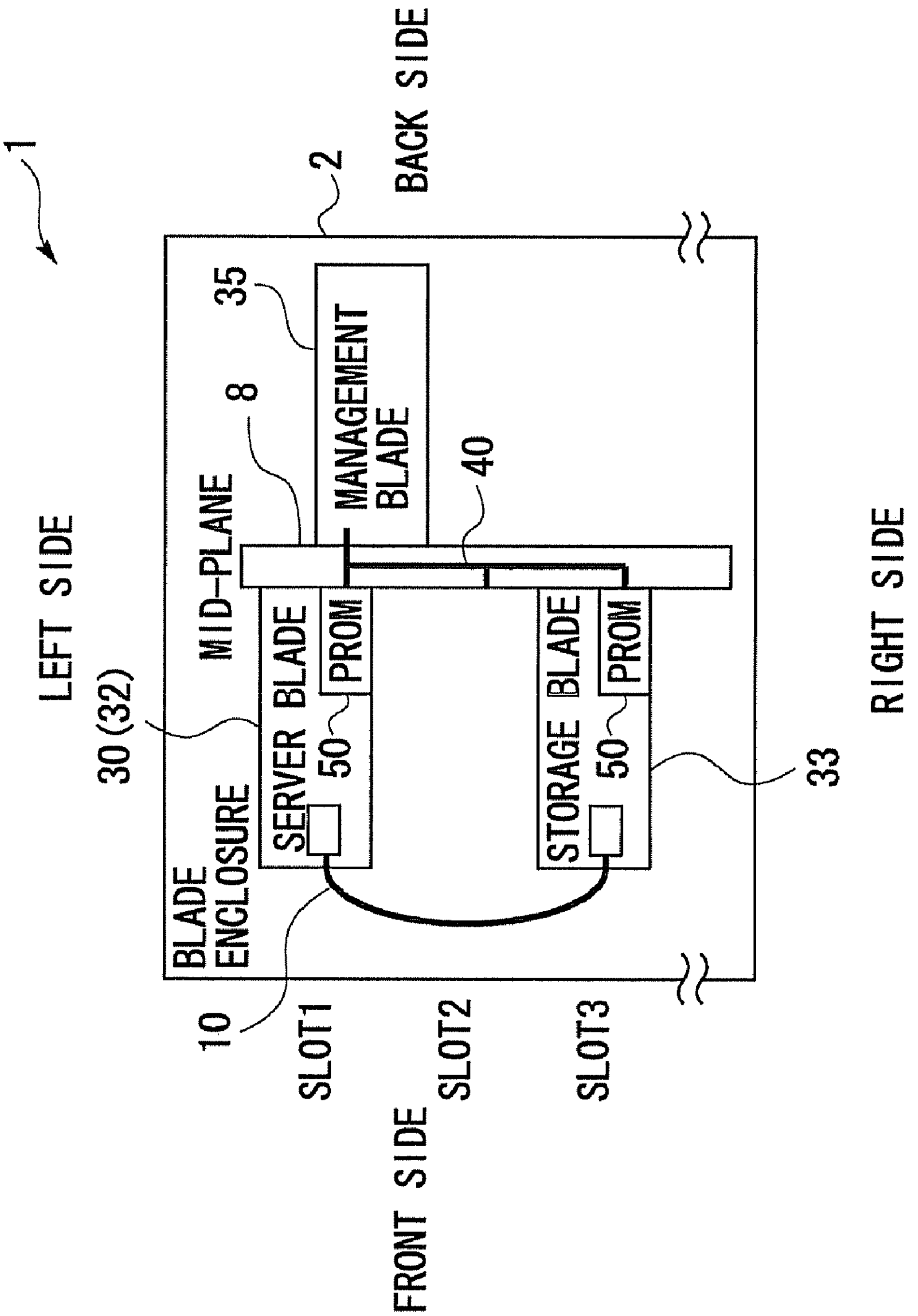
FIG. 16 is an example of a front view of a state of a set 5.

With reference to FIG. 16, a set 5 is described. The set 5 exemplifies a case in which the storage blade 33 is mounted at a place away from the server blade 30. Specifically, this is a case in which the server blade 30 (new-generation server blade 32) is located at the N-th slot, the storage blade 33 is located ±α away (in FIG. 16, one slot (+α) rightward away), that is, at the (N±α)-th slot, and the both are connected with the cable 10.

Incidentally, any one of the server blade 30 and the storage blade 33 may be mounted into the slot between the server blade 30 (new-generation server blade 32) located at the N-th slot and the storage blade 33 at the (N±α)-th position (slot 2 in this case). It is noted that the set 5 represents a case in which only the server blade 30 at the N-th position and the storage blade 33 at the (N±α)-th position are connected.

Further, FIG. 17 illustrates a set 6. This case is an example in which while a plurality of the server blades 30 (new-generation server blades 32) are mounted in series, there is mounted a single storage blade 33.

To describe in detail, the starting point is the N-th slot. Then, in this example, the server blades 30 (new-generation server blades 32) are located in series from that point through the (N±α)-th slot, which is α away in any one of the rightward and leftward directions, and the storage blade 33 is located at the slot that is further one slot away in the rightward or leftward direction. In this embodiment, there is exemplified a case in which the server blades 30 are provided in series in the rightward direction (plus direction), and the single storage blade 33 is provided immediately adjacent to those server blades 30 in series. It is noted that the number of the server blades 30 in series is two in FIG. 17.

Regarding those, description using flow charts is omitted. However, any one of the cases is realizable by designing logic for power supply control. Specifically, it is requested that information as to which server blade is connected to which storage blade be defined in the management blade 35 after all the units are mounted in the chassis 2. In other words, it is only necessary that the management blade 35 can recognize such relations.

Further, such a case is conceivable, in which information indicating that a particular storage blade is for the N-th server blade (information may be identification information or may specify N-th blade) is written in the storage-side PROM 50.

Further, in place of the PROM, a DIP switch (dual in-line package switch) may be employed. The slot number of a server blade is assumed to be N, and then, the same number N may be set for the DIP switch of a storage blade that is to be connected to that server blade, thereby designating the server to be connected.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

<Note>

According to an aspect of the invention, an electronic device includes: an information processing unit including at least a processor; a storage unit including an external storage device for the processor; and a management unit that controls start-up and shut-down of the information processing unit and the storage unit, wherein: the information processing unit and the storage unit are connected to each other through any one of a first interface and a second interface, the first interface being capable of predetermined control in which, at power-on, the power-on of the storage unit is executed first, and after the storage unit is put into operation, the information processing unit is powered on, the second interface being incapable of the predetermined control; the information processing unit includes, on a bus accessible from the management unit, a non-volatile storage device storing information that indicates a type of interface used for connecting the storage unit; and the management unit reads out, upon reception of an instruction to power on the information processing unit, the type of interface from the non-volatile storage device of the information processing unit, wherein, when the information processing unit is connected to the storage unit through the first interface, the management unit performs the power-on by the predetermined control through the first interface; and when the information processing unit is not connected to the storage unit through the first interface, power on the storage unit, and after the storage unit is put into operation, power on the information processing unit.

Herein, the information processing unit means the server blade. The server blade includes the new-generation server blade that can be connected to the storage unit through the SAS interface, and the previous-generation server blade that cannot be connected through the SAS interface but can be connected to the storage unit through the SCSI interface. The storage unit means the storage blade with the SAS interface.

According to the electronic device, when the information processing unit is not connected to the storage unit through the first interface, the storage unit is powered on, and after the storage unit is put into operation, the information processing unit is powered on. Accordingly, after the storage unit is put into operation, the power-on of the information processing unit can be performed in a linked manner. Thus, according to the electronic device, it is possible to eliminate the trouble of manually turning on the power supply to a plurality of units.

Therefore, according to the electronic device, even in the system in which information processing units and storage units having different interfaces coexist, it is possible to absorb, mainly at power-on, differences in function.

What is claimed is:

1. A power-on method for an electronic device, comprising:

receiving an instruction to power on an information processing unit;

reading out a type of interface from a non-volatile storage device;

when the information processing unit is connected to a storage unit through a first interface being capable of a predetermined control in which, at power-on, the power-on of the storage unit is executed first, and after the storage unit is put into operation, the information processing unit is powered on, performing power-on by the predetermined control through the first interface; and when the information processing unit is connected to the storage unit through a second interface incapable of the predetermined control, powering on the storage unit, and after the storage unit is put into operation, powering on the information processing unit.

2. The power-on method for the electronic device according to claim 1 comprising:

when it is judged that the information processing unit and the storage unit are connected to each other through the second interface and power is shut off, shutting off the information processing unit before shutting off the storage unit, wherein the information processing unit and the storage unit are installed adjacently to each other.

3. A non-transitory computer readable storage medium stored with a program executed by a machine, upon the program executing, the machine executing:

receiving an instruction to power on an information processing unit;

reading out a type of interface from a non-volatile storage device;

executing a power-on of a storage unit and after the storage unit is put into operation, the information processing unit is powered on, performing power-on of the information processing unit by a predetermined control through the first interface when the information processing unit is connected to the storage unit through the first interface being capable of the predetermined control; and powering on the storage unit, when the information processing unit is connected to the storage unit through a second interface incapable of the predetermined control, and after the storage unit is put into operation, powering on the information processing unit.

4. An electronic device comprising:

an information processing unit including at least a processor;

a storage unit including an external storage device for the processor; and a management unit that controls start-up and shut-down of the information processing unit and the storage unit, wherein:

the information processing unit and the storage unit are connected to each other through any one of a first interface and a second interface, the first interface being capable of a predetermined control in which, at a power-on, the power-on of the storage unit is executed first, and after the storage unit is put into operation, the information processing unit is powered on, and the second interface incapable of the predetermined control, the information processing unit includes, on a bus accessible from the management unit, a non-volatile storage device storing information indicating a type of interface used for connecting the storage unit, and the management unit reads out, upon reception of an instruction to power on the information processing unit, the type of interface from the non-volatile storage device of the information processing unit, wherein when the information processing unit is connected to the storage unit through the first interface, the management unit performs the power-on by the predetermined control through the first interface, and when the information processing unit is connected to the storage unit through the second interface, the management unit powers on the storage unit, and after the storage unit is put into operation, the management unit powers on the information processing unit.

5. The electronic device according to claim 1, wherein:

the information processing unit and the storage unit are installed adjacently to each other; and when it is judged that the information processing unit and the storage unit are connected to each other through the second interface and power is shut off, the management unit powers off the information processing unit before powering off the storage unit.

* * * * *

UNITED STATES PATENT AND TRADEMARK OFFICE

CERTIFICATE OF CORRECTION

PATENT NO. : 8,380,967 B2
APPLICATION NO. : 12/423188
DATED : February 19, 2013
INVENTOR(S) : Ikkei Kinouchi It is certified that error appears in the above-identified patent and that said Letters Patent is hereby corrected as shown below:

In the Claims:

Column 16, Line 67, In Claim 5, delete “claim 1,” and insert -- claim 4, --, therefor.

Signed and Sealed this
Twenty-eighth Day of May, 2013

Teresa Stanek Rea
*Acting Director of the United States Patent and Trademark Office*